Figure 1:
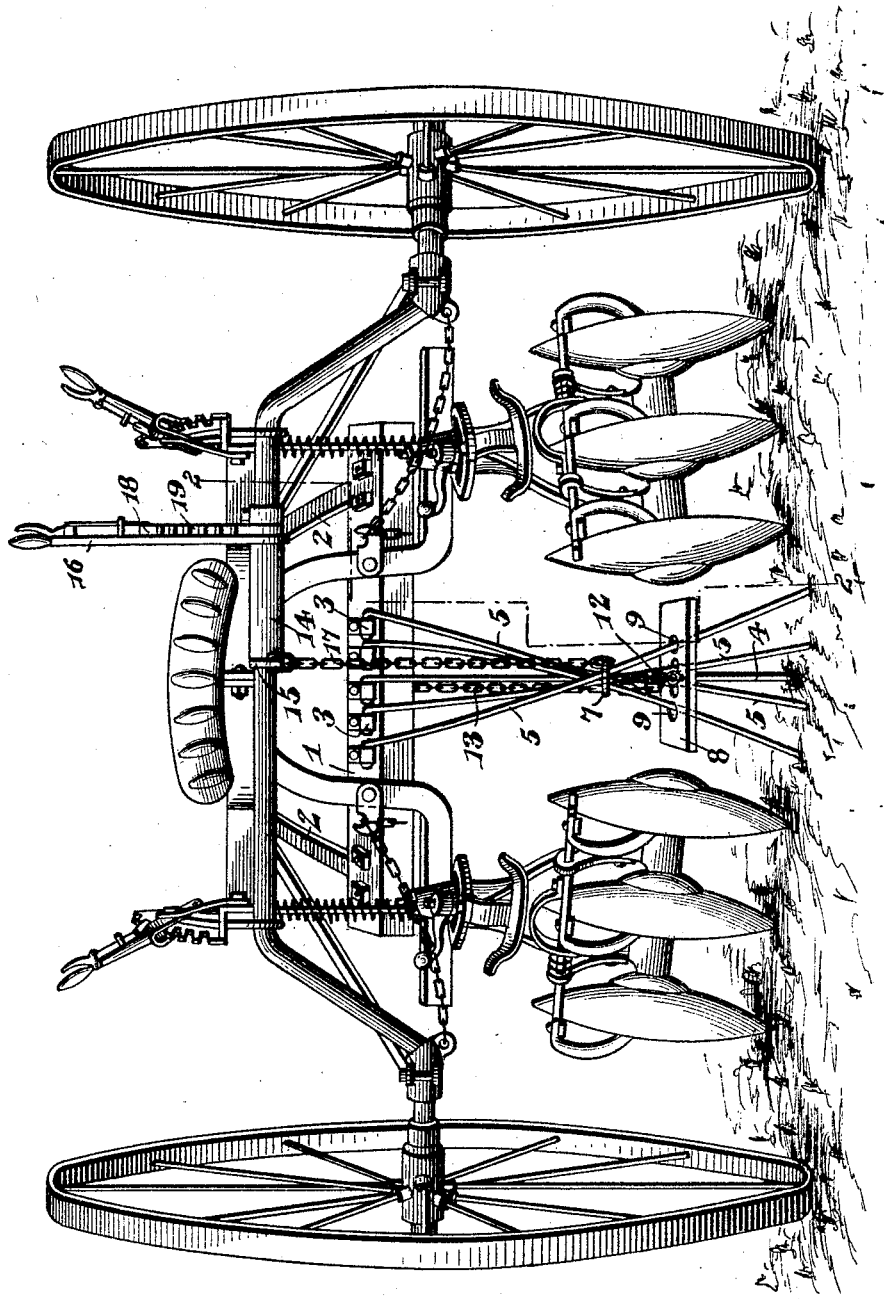

No. 796,667. PATENTED AUG. 8, 1905.
E. MARSALIS.
DRILL HARROW.
APPLICATION FILED DEC. 31, 1904.

2 SHEETS—SHEET 1.

Elijah Marsalis, Inventor

Witnesses
Jas. K. McCalvan
J. F. Riley

By C. G. Siggers
Attorney

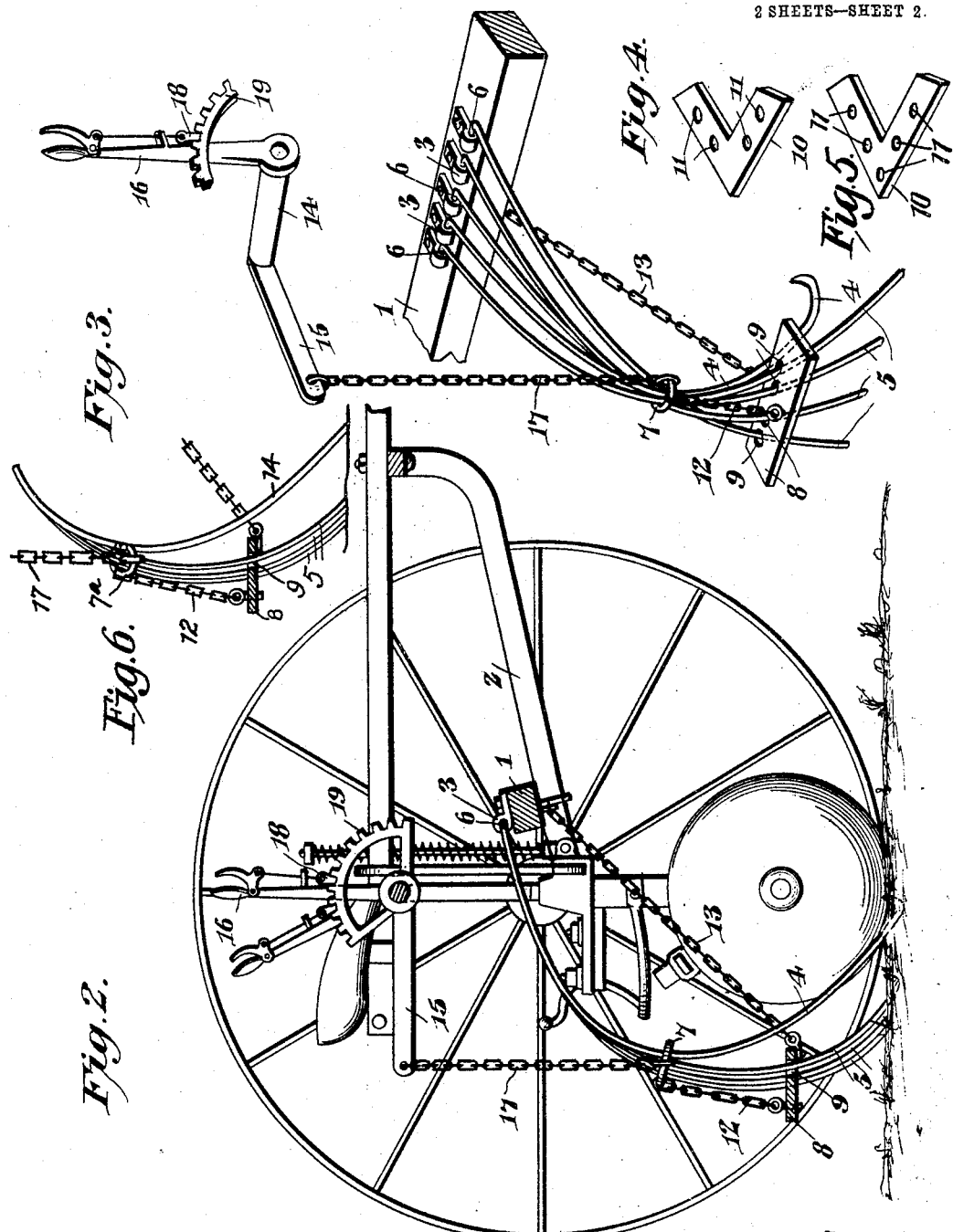

UNITED STATES PATENT OFFICE.

ELIJAH MARSALIS, OF SMITHDALE, MISSISSIPPI.

DRILL-HARROW.

No. 796,667.     Specification of Letters Patent.     Patented Aug. 8, 1905.

Application filed December 31, 1904. Serial No. 239,213.

*To all whom it may concern:*

Be it known that I, ELIJAH MARSALIS, a citizen of the United States, residing at Smithdale, in the county of Amite and State of Mississippi, have invented a new and useful Drill-Harrow, of which the following is a specification.

The invention relates to improvements in drill-harrows.

The object of the present invention is to improve the construction of drill-harrows and to provide a simple, inexpensive, and efficient device adapted to be readily applied to various kinds of cultivators, plows, harrows, and the like and capable of pulverizing the soil and of working the same close to the plants without injuring the latter.

A further object of the invention is to provide a drill-harrow designed for use on both walking and riding implements and adapted to obviate the necessity of following a cultivator or other implement with a hand-hoe to complete the cultivating operation.

Another object of the invention is to provide a drill-harrow by which the teeth may be readily adjusted to vary the distance between them and to arrange them properly with relation to the size of the plants under cultivation.

The invention also has for its object to provide means for clearing the drill-harrow of sticks or other objects that might be forced over the plants by the teeth.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a rear view of a cultivator provided with a drill-harrow constructed in accordance with this invention. Fig 2 is a longitudinal sectional view on the line 2 2 of Fig. 1. Fig. 3 is a detail perspective view of the drill-harrow. Fig. 4 is a detail view showing another form of gage-board. Fig. 5 is a detail view of a gage-board, illustrating a modification of the invention. Fig. 6 is a detail view illustrating another modification of the invention.

Like numerals of reference designate corresponding parts in all the figures of the drawings.

1 designates a transverse bar or beam designed to be mounted on the draw-bars 2 or other portion of the cultivator and provided with eyes or bearings 3 for hinging teeth 4 and 5 to it. The transverse bar or beam, which forms a support for the teeth, may be secured to a plow, harrow, or any other form of cultivator, either riding or walking, the drill-harrow attachment being designed for pulverizing and working the soil close to the plants for obviating the necessity of following a cultivator, plow, or harrow with a hand-hoe. It is also adapted to do more effective work than a hand-hoe and will operate close to plants without injuring the same. The device when run close to young plants plows and hoes the same where the hand-hoe cannot reach, giving the plants fresh earth and loosening the soil and thereby causing the plants to grow more rapidly. The eyes or bearings are provided with attachment portions or plates, which are bolted or otherwise secured to the cross bar or beam. The teeth 4 and 5 are provided at their upper ends with pintles 6, arranged in the eyes or bearings, whereby the teeth are hinged to the cross bar or beam and are capable of independent movement or adjustment. The pintles are preferably formed by bending the upper ends of the teeth at an angle, as shown; but any other means may be employed for hinging the teeth to the cross-bar or support. The tooth 4, which is centrally arranged, is located in advance of the other teeth 5 and its lower portion is curved forward and it is adapted to operate as a guard for clearing the drill-harrow of sticks or other obstructions that might be forced over the plants by the other teeth 5. The teeth 5, which are spring-teeth, are curved, as shown, and are crossed between their ends, those having their upper ends hinged to the cross bar or support at the right-hand side of the support operating at the left-hand side and those hinged at the left-hand side operating at the right-hand side. The teeth at the point of crossing are arranged within a connecting device 7, preferably consisting of an adjustable ring slidable on the teeth in the preliminary adjustment of the same. The teeth are maintained the proper distance apart and in proper position with relation to each other and to the plants under cultivation by means of a gage-board 8, having openings 9 through which the teeth pass, as clearly shown in Figs. 1 and 3 of the drawings. The gage-board may be straight and provided with a straight series of openings, as illustrated in Figs. 1 to 3, inclusive, or a substantially V-shaped gage-board 10, having opposite rows of openings 11, as illustrated in Fig. 4, may be employed. The contiguous angularly-disposed row may be employed, or the teeth may be arranged in any other preferred order, an even number of teeth 5 being preferably employed.

The gage-board, which is adjustable vertically, is connected with the ring by a chain 12 or other suitable flexible connection adapted when the ring and the gage-board are properly adjusted to be drawn tight, whereby the gage-board and ring will be securely held in their adjusted positions. The spreading or divergence of the lower portions of the teeth form a tapered support for the ring and limit the downward movement thereof. The teeth also prevent the upward movement of the gage-board when the latter and the ring are connected by the chain. However, when the chain 12 is loosened the ring and the gage-board may be freely adjusted to vary the distance between the lower portions of the teeth.

The depth of the teeth in the soil is regulated by a chain 13 or other flexible connection secured at its rear end to the gage-board and adjustably connected at its upper end to the cross-bar or support upon which the teeth are mounted. The resiliency of the spring-teeth will maintain their lower ends at the surface of the soil, or thereabout, when the chain 13 is slack, and by drawing the latter taut the teeth are bowed downwardly and forwardly and caused to enter the soil to the desired depth. The eyes or bearings are located in advance of the rear edge of the cross-bar or support, which receives and limits the downward swing of the teeth on their pintles; but the teeth are permitted to swing upward freely when the connection 13 is released, and by this means the drill-harrow may be thrown out of operation when desired without interfering with the operation of the cultivator or other implement. For this purpose a rock-shaft 14 is employed and is journaled in suitable bearings on the cultivator, one end of the rock-shaft being provided with an arm 15 and the other end with a lever or operating arm 16. The arm 15 is connected by a chain 17 with the drill-harrow, the lower end of the chain being preferably secured to the ring. The operating arm or lever 16 is provided with a suitable detent 18, arranged to engage a curved ratchet 19 for securing the rock-shaft in its adjustment.

The attachment, which is adapted to be applied to various kinds of plows, harrows, and cultivators, is adapted to complete the operation of the same. It is more effective in its operation than the work of a hand-hoe, and it obviates the necessity of employing the latter to complete the work of a cultivator or other farm implement.

When a V-shaped gage-board is employed, as shown in Fig. 4, an additional opening may be provided at the apex to receive the front tooth 4, as illustrated in Fig. 5 of the drawings. Also the connecting device for embracing the teeth 5 may consist of a relatively stationary ring $7^a$, rigid with the spring-tooth 4.

Having thus fully described my invention, what I claim as new, and desire to secure by Letters Patent, is—

1. A drill-harrow attachment for cultivators, plows, &c., comprising a support, a plurality of spring-teeth hinged to the support, and a guard or clearing tooth located in advance of the said teeth for clearing the attachment of sticks and the like.

2. A drill-harrow attachment for cultivators, comprising a plurality of pivotally-mounted teeth, an adjustable gage having openings receiving the teeth, said gage being located at an intermediate point on the teeth, and means connected with the gage for raising and lowering the same.

3. A drill-harrow attachment for cultivators, comprising a plurality of teeth, an adjustable gage having openings receiving the teeth, said gage being located at an intermediate point on the teeth, and adjusting means for moving the gage longitudinally of the cultivator to bend or bow the teeth.

4. A drill-harrow attachment for cultivators, comprising a plurality of teeth, a gage provided with openings for the teeth and located at an intermediate point on the same, said gage being slidable on the teeth for raising and lowering it, means for securing the gage in its vertical adjustment, and adjusting means for moving the gage longitudinally of the cultivator to bend or bow the teeth.

5. A drill-harrow attachment, comprising a plurality of teeth crossed at a common point and having divergent lower portions, and an adjustable gage located below the said point of crossing and provided with openings receiving the divergent portions of the teeth, said gage being adjustable to vary the distance between the lower ends of the teeth.

6. A drill-harrow attachment, comprising a plurality of teeth, provided at their upper ends with attaching means and all crossed at a common point between their ends an adjustable device connecting the teeth at the point of crossing, and an adjustable gage receiving the teeth below the point of crossing and movable upward and downward to vary the distance between the teeth.

7. A drill-harrow attachment, comprising a plurality of crossed teeth, an adjustable device connecting the teeth at the point of crossing, an adjustable gage receiving the teeth below the point of crossing and movable upward and downward to vary the distance between the teeth, and means for connecting the adjustable device and the gage, whereby the same are secured in their adjustment.

8. A drill-harrow attachment, comprising a plurality of crossed teeth, a slidable connecting device receiving the teeth at the point of crossing, a gage having openings receiving the teeth, and adjustable means connecting the gage and the slidable device.

9. A drill-harrow attachment, comprising a support, a plurality of spring-teeth extending downward from the support, said teeth being curved, and means adjustably connected with the lower portions of the teeth for bowing the same to regulate the depth of the device.

10. A drill-harrow attachment, comprising a support, a plurality of spring-teeth mounted on the support, said teeth being curved and crossed between their ends, a gage connecting the teeth below the point of crossing, and adjustable means connected with the gage for bowing the teeth.

11. A drill-harrow attachment, comprising a support, a plurality of teeth all crossed at a common point and hinged at their upper ends to the support, and means for swinging the teeth upward out of operation.

12. A drill-harrow attachment, comprising a support, a plurality of teeth hinged to the support and crossed between their ends, a slidable device connecting the teeth at the point of crossing, and means connected with the slidable device for swinging the teeth upward out of operation.

13. A drill-harrow attachment, comprising a support, a series of teeth independently hinged to the support, and means for connecting all the teeth in a bunch at an intermediate point of their length, the lower ends of the teeth being spread apart and engaging the soil at different points.

14. A drill-harrow attachment, comprising a support, a series of teeth hinged to the support, and a slidable connecting device encircling all the teeth at an intermediate point of their length, said device holding the teeth in a bunch, the lower ends of the teeth being spread apart and engaging the soil at different points.

15. A drill-harrow attachment, comprising a support, a series of teeth arranged in a bunch and hinged to the support, and a gage having openings through which the teeth pass.

16. A drill-harrow attachment, comprising a support, a series of teeth arranged in a bunch and hinged to the support, and a gage having openings through which the teeth pass, said gage being provided with means for adjusting the same vertically along the teeth.

17. A drill-harrow attachment for cultivators, comprising a support, a series of teeth carried by the support and bunched together at an intermediate point, and a gage located below the point of bunching and movable upward and downward on the teeth for adjusting the same.

18. A drill-harrow attachment for cultivators, comprising a plurality of teeth, a gage receiving the teeth and located at an intermediate point on the same, and a guard or clearing tooth located in advance of the gage for clearing the attachment of sticks and the like.

19. A drill-harrow attachment for cultivators, comprising a plurality of spring-teeth, a gage receiving the teeth and located at an intermediate point on the same, and a chain arranged in front of the teeth and connected with the gage for bending or bowing the said teeth.

20. A drill-harrow attachment for cultivators, comprising a plurality of hinged teeth, a gage receiving the teeth and located at an intermediate point on the same, a chain located in advance of the teeth and connected with the gage for bending or bowing the teeth, and adjusting means also connected with the gage for swinging the teeth upward on their pivotal connection.

In testimony that I claim the foregoing as my own I have hereto affixed my signature in the presence of two witnesses.

ELIJAH MARSALIS.

Witnesses:
E. R. GORDON,
J. K. WEBB.